United States Patent
Tiwari et al.

(10) Patent No.: US 11,700,869 B2
(45) Date of Patent: Jul. 18, 2023

(54) MOUTHFEEL ENHANCING COMPOSITION

(71) Applicant: PepsiCo, Inc., Purchase, NY (US)

(72) Inventors: Rashmi Tiwari, White Plains, NY (US); Laura Nattress, Tarrytown, NY (US); Thomas Lee, Scarsdale, NY (US)

(73) Assignee: PepsiCo, Inc., Purchase, NY (US)

( * ) Notice: Subject to any disclaimer, the term of this patent is extended or adjusted under 35 U.S.C. 154(b) by 1353 days.

(21) Appl. No.: 16/020,239

(22) Filed: Jun. 27, 2018

(65) Prior Publication Data

US 2020/0000126 A1 Jan. 2, 2020

(51) Int. Cl.
| | |
|---|---|
| A23L 27/00 | (2016.01) |
| A23L 2/60 | (2006.01) |
| A23L 2/385 | (2006.01) |
| A23L 27/10 | (2016.01) |
| A23L 2/56 | (2006.01) |

(52) U.S. Cl.
CPC ............... *A23L 2/60* (2013.01); *A23L 2/385* (2013.01); *A23L 2/56* (2013.01); *A23L 27/11* (2016.08); *A23L 27/88* (2016.08); *A23V 2002/00* (2013.01); *A23V 2200/14* (2013.01); *A23V 2250/2132* (2013.01)

(58) Field of Classification Search
CPC ...................................................... A23L 2/385
See application file for complete search history.

(56) References Cited

U.S. PATENT DOCUMENTS

| | | |
|---|---|---|
| 4,830,862 A | 5/1989 | Braun et al. |
| 4,925,686 A | 5/1990 | Kastin |
| 7,052,725 B2 | 5/2006 | Chang et al. |
| 7,815,956 B2 | 10/2010 | Lee et al. |
| 8,877,922 B2 | 11/2014 | Tachdjian et al. |
| 2007/0248731 A1 | 10/2007 | Curti et al. |
| 2009/0162484 A1 | 6/2009 | Bell et al. |
| 2011/0009613 A1 | 1/2011 | Kaukovirta-Norja et al. |
| 2013/0216692 A1 | 8/2013 | Sabater et al. |
| 2013/0259973 A1 | 10/2013 | Valdez et al. |
| 2014/0093630 A1 | 4/2014 | Shigemura et al. |
| 2014/0094453 A1 | 4/2014 | Tachdjian et al. |
| 2014/0171520 A1 | 6/2014 | Markosyan et al. |
| 2014/0271996 A1 | 9/2014 | Prakash et al. |
| 2014/0272068 A1 | 9/2014 | Prakash et al. |
| 2015/0374021 A1 | 12/2015 | Van Lengerich et al. |
| 2016/0106125 A1 | 4/2016 | Rascon |
| 2017/0095428 A1 | 4/2017 | Oishi et al. |
| 2018/0092381 A1 | 4/2018 | Brijwani et al. |
| 2019/0133170 A1 | 5/2019 | Brijwani et al. |

FOREIGN PATENT DOCUMENTS

| | | |
|---|---|---|
| JP | H10-120704 A | 5/1998 |
| WO | WO 01/11988 A2 | 2/2001 |
| WO | WO-2008006589 A2 | 1/2008 |
| WO | WO-2009157810 A1 | 12/2009 |
| WO | WO 2010/025000 A1 | 3/2010 |
| WO | WO 2010/088744 A2 | 8/2010 |
| WO | WO 2013/096290 * | 6/2013 |
| WO | WO 2016/040577 A1 | 3/2016 |
| WO | WO 2016/071463 A1 | 5/2016 |

OTHER PUBLICATIONS

Morton, J., "Tropical Fruit Tree and Other Exotic Foliage as Human Food", Florida State Horticultural Society, (1968), pp. 318-329 (Year: 1968).*
Jin et al., "5-Alkylresorcinols from Merulius incarnatus", J. Nat. Prod., 69, (2006), pp. 704-706. (Year: 2006).*
Bunyapaiboonsri et al., Phenolic Glycosides form the Filamentous Fungus *Acremonium* sp. BCC 14080, J. Nat. Prod., 71, (2008), pp. 891-894. (Year: 2008).*
Voragen, A.G.J., et al., "Determination of the degree of methylation and acetylation of pectins by h.p.l.c.," *Food Hydrocolloids*, vol. 1(1): 65-70 (1986).
Co-Pending Application, U.S. Appl. No. 15/807,294, inventors Brijwani, K., et al., filed Nov. 8, 2017 (Not Published).
International Search Report and Written Opinion for International Application No. PCT/US19/37863, ISA, United States, dated Sep. 3, 2019, 10 pages.
Odchimar, N., et al., Antioxidant Activity, Total Phenolic Content, and GC-MS Analysis of the root of Kawilan (*Embeliaphilippinensis*A, DC.) Bulletin of Environment, Pharmacology and Life Sciences 5(5):42-47, Academy for Environment and Life Sciences, India, (2016).
Zaidi, S.F., "*Helicobacter pylori* associated Asian enigma: Does diet deserve distinction?," World Journal of Gastrointestinal Oncology 8(4):341-350, Baishideng Publishing Group, China (2016).
Zheng, Y., et al., "Resorcinol derivatives from Ardisia maculosa," Journal of Asian Natural Product Research, 9(6):545-549, Taylor and Francis, United States (2007).
Dang, P., et al. "α-Glucosidase Inhibitors from the Stems of *Embelia ribes*," *Phytotherapy Research* 28:1632-1636, Wiley, United States (May 2014).
Jin, W., et al., "5-Alkylresorcinols from *Merulius incarnatus*," J. Nat Prod., 69:704-706, American Chemical Society, United States (Mar. 2006).

* cited by examiner

*Primary Examiner* — Elizabeth Gwartney
(74) *Attorney, Agent, or Firm* — Sterne, Kessler, Goldstein & Fox P.L.L.C.

(57) ABSTRACT

This disclosure provides novel compositions comprising a compound of Formula I. These compositions are useful for improving mouthfeel properties of non-nutritive sweeteners, such as steviol glycosides and blends thereof, in food and beverages containing the same.

19 Claims, No Drawings

MOUTHFEEL ENHANCING COMPOSITION

FIELD

The present disclosure is directed to a composition having improved mouthfeel and methods of improving mouthfeel.

BACKGROUND

Nutritive sweeteners such as sucrose or high fructose corn syrup (HFCS) impart sweetness and rich mouthfeel to beverages. However, when sugar is wholly or partially replaced with one or more high intensity non-nutritive sweeteners, there is an undesirable change in mouthfeel due to a reduction in the quantity of dissolved solids in the beverage.

Food and beverage manufacturers have attempted to improve mouthfeel and flavor profiles of non-nutritive sweeteners using taste masking or taste altering agents. However, there is still a need for compositions and methods suitable for improving the mouthfeel of beverages and foods containing non-nutritive sweeteners.

BRIEF SUMMARY

The present disclosure is directed to a composition having improved mouthfeel comprising one or more mouthfeel enhancing compounds disclosed herein, and methods of improving mouthfeel in beverages and other comestibles. The compositions can be used in various products, including beverages, beverage concentrates, and food products. In certain embodiments, the composition can be added to beverage or food products.

In some embodiments, the present disclosure is directed to a composition comprising a compound of Formula I:

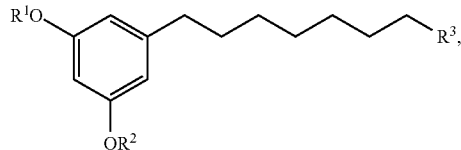

Formula I wherein $R^1$ and $R^2$ are H or glucosyl; and $R^3$ is a $C_1$-$C_{15}$ linear, branched, or cyclic alkyl, alkenyl, or alkynyl group. In some embodiments, $R^3$ is a linear alkenyl group. In some embodiments, the compound is a compound of Formula II:

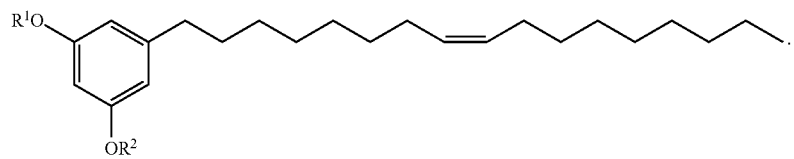

Formula II

In some embodiments, the compound of Formula I is present in the composition at a concentration of about 0.1 ppm to about 1000 ppm. In other embodiments, the compound of Formula I is present in the composition at a concentration of about 1 ppm to about 500 ppm. In other embodiments, the compound of Formula I is present in the composition at a concentration of about 5 ppm to about 200 ppm. In other embodiments, the compound of Formula I is present in the composition at a concentration of about 50 ppm to about 100 ppm. In other embodiments, the compound of Formula I is present in the composition at a concentration of about 100 ppm.

In some embodiments, the composition is a beverage. In some embodiments, the compound of Formula I is present in the beverage at a concentration of about 50 ppm to about 100 ppm.

In some embodiments, the composition is a beverage concentrate. In some embodiments, the compound of Formula I is present in the beverage concentrate at a concentration of about 300 ppm to about 600 ppm.

In some embodiments, the beverage further comprises a non-nutritive sweetener. In some embodiments, the non-nutritive sweetener is selected from the group consisting of a steviol glycoside, Lo Han Guo sweetener, rubusoside, siamenoside, monatin, curculin, glycyrrhizic acid, neohesperidin, dihydrochalcone, glycyrrhizin, glycyphyllin, phloridzin, trilobatin, phyllodulcin, brazzein, hernandulcin, osladin, polypodoside A, baiyunoside, pterocaryoside A and B, mukurozioside, thaumatin, monellin, mabinlins I and II, phlomisoside I, periandrin I, abrusoside A, and cyclocarioside I, mogroside IV, mogroside V, or combinations thereof. In some embodiments, the steviol glycoside is selected from the group consisting of stevioside, rebaudioside A, rebaudioside B, rebaudioside C, rebaudioside D, rebaudioside E, rebaudioside F, rebaudioside G rebaudioside H rebaudioside I, rebaudioside J, rebaudioside K, rebaudioside L, rebaudioside M, rebaudioside N, rebaudioside O, rebaudioside P, rebaudioside Q, steviolbioside, dulcoside A, and combinations thereof.

In some embodiments, the beverage further comprises a nutritive sweetener. In some embodiments, the nutritive sweetener is selected from the group consisting of sucrose, fructose, glucose, dextrose, maltose, trehalose, fructo-oligosaccharides, glucose-fructose syrup from natural sources such as apple, chicory, and honey; high fructose corn syrup, invert sugar, maple syrup, maple sugar, honey, brown sugar molasses, cane molasses, such as first molasses, second molasses, blackstrap molasses, and sugar beet molasses; sorghum syrup, and mixtures thereof.

In some embodiments, the beverage is a carbonated beverage, a non-carbonated beverage, a fountain beverage, a frozen beverage, a frozen carbonated beverage, a fruit juice, a fruit juice-flavored drink, a fruit-flavored drink, a cola beverage, a sports drink, an energy drink, a fortified/enhanced water drink, a flavored water, a soy drink, a vegetable drink, a grain-based drink, a malt beverage, a fermented drink, a yogurt drink, kefir, a coffee beverage, a tea beverage, a dairy beverage, a smoothie drink, a caffeinated energy drink, or an alcoholic beverage.

In some embodiments, the present disclosure is directed to a method for improving mouthfeel of a beverage, the method comprising adding to the beverage a compound of Formula I:

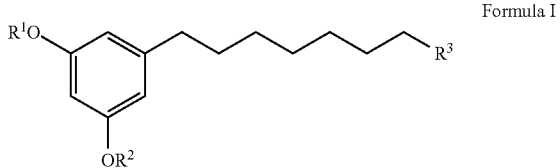

Formula I wherein $R^1$ and $R^2$ are H or glucosyl; and $R^3$ is a $C_1$-$C_{15}$ linear, branched, or cyclic alkyl, alkenyl, or alkynyl group. In some embodiments, the compound is a compound of Formula II:

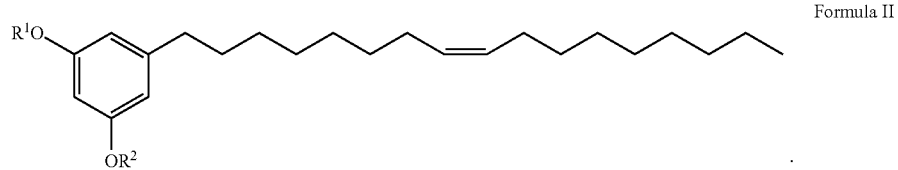

Formula II

In some embodiments, the compound of Formula I is added to the beverage in an amount sufficient to achieve a final concentration in the beverage of about 0.1 ppm to about 1000 ppm. In other embodiments, the compound of Formula I is added to the beverage in an amount sufficient to achieve a final concentration in the beverage of about 1 ppm to about 500 ppm. In other embodiments, the compound of Formula I is added to the beverage in an amount sufficient to achieve a final concentration in the beverage of about 50 ppm to about 100 ppm. In other embodiments, the compound of Formula I is added to the beverage in an amount sufficient to achieve a final concentration in the beverage of about 100 ppm.

In some embodiments, the present disclosure is directed to a method for improving mouthfeel of a beverage, comprising adding to the beverage an extract of the *Embelia philippinensis* plant. In some embodiments, the extract comprises a compound of Formula I:

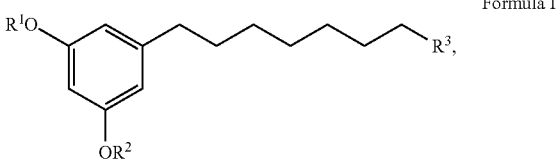

Formula I wherein $R^1$ and $R^2$ are H or glucosyl; and $R^3$ is a $C_1$-$C_{15}$ linear, branched, or cyclic alkyl, alkenyl, or alkynyl group. In some embodiments, the extract comprises a compound of Formula II:

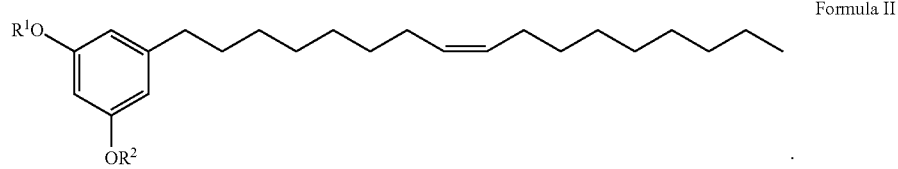

Formula II

In some embodiments, the present disclosure is directed to a method of making a beverage comprising combining at least 1 part of a beverage concentrate; and 5 parts water; wherein the beverage concentrate comprises a compound of Formula I:

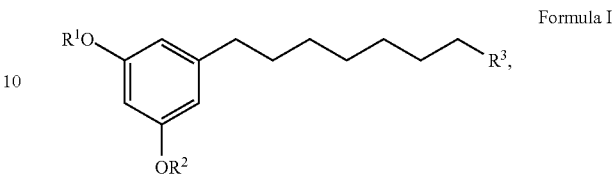

Formula I wherein $R^1$ and $R^2$ are H or glucosyl; and $R^3$ is a $C_1$-$C_{15}$ linear, branched, or cyclic alkyl, alkenyl, or alkynyl group.

In some embodiments, the compound of Formula I is present in the beverage concentrate at a concentration of about 300 ppm to about 600 ppm.

In some embodiments, the present disclosure is directed to a method of isolating a compound of Formula I from the *Embelia phihppinensis* plant,

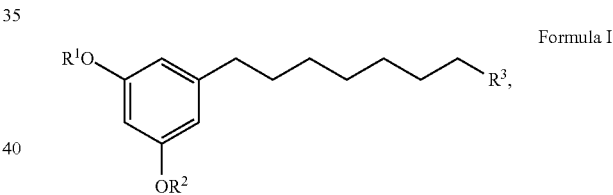

Formula I wherein $R^1$ and $R^2$ are H or glucosyl; and $R^3$ is a $C_1$-$C_{15}$ linear, branched, or cyclic alkyl, alkenyl, or alkynyl group; the method comprising (a) mixing the *Embelia phihppinensis* plant with an alcoholic solvent; (b) separating the alcoholic solvent from the mixture; (c) concentrating the alcoholic solvent to obtain an alcohol extract concentrate; and (d) isolating the compound of Formula I from the alcohol extract concentrate.

DETAILED DESCRIPTION

Potent non-nutritive sweeteners, including steviol glycosides, often have undesirable mouthfeel properties. It has now been unexpectedly discovered that these undesirable mouthfeel properties can be improved by a compound of Formula I:

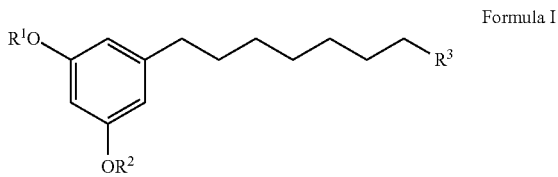

Formula I wherein $R^1$ and $R^2$ can be, independently, H or glucosyl; and $R^3$ can be a $C_1$-$C_{15}$ linear, branched, or cyclic alkyl, alkenyl, or alkynyl group.

Definitions

Various embodiments of the compositions and methods disclosed herein are possible and will be apparent to the person of ordinary skill in the art, given the benefit of this disclosure. In this disclosure reference to "some embodiments," "certain embodiments," "particular embodiments" and similar phrases each means that those embodiments are non-limiting examples of the subject matter described herein.

The articles "a," "an," and "the" are used herein to refer to one or to more than one (that is, at least one) of the grammatical object of the article. By way of example, "a compound" means one compound or more than one compound.

As used herein, the term "about" means ±10% of the noted value. By way of example only, a composition comprising "about 30 ppm" of a compound could include from 27 ppm of the compound up to and including 33 ppm of the compound.

The term "treated water" refers to water from which substantially all mineral content has been removed, typically containing no more than about 500 ppm total dissolved solids, such as 250 ppm total dissolved solids. Methods of producing treated water are known to those of ordinary skill in the art and include deionization, distillation, filtration and reverse osmosis ("r-o"), among others, for example, as disclosed in U.S. Pat. No. 7,052,725. The term "treated water" is understood to be generally synonymous with additional terms in the art, such as, for example, "purified water," "demineralized water," "distilled water," and "r-o water."

As used herein, "taste" refers to a combination of sweetness perception, temporal effects of sweetness perception (on-set and duration), off-tastes, such as bitterness and metallic taste, residual perception (aftertaste), and tactile perception, such as body and thickness.

As used herein, "mouthfeel" refers to physical sensations in the mouth produced by a food or beverage, including, but not limited to, heaviness, thickness, viscosity, wetness, smoothness, and mouth coating.

The term "nutritive sweetener" refers to sweeteners that provide significant caloric content in typical usage amounts, such as more than about 5 calories per 8 oz. serving of a beverage.

As used herein, the term "non-nutritive sweetener" refers to all sweeteners other than nutritive sweeteners.

The term "concentrate" is used throughout the specification and refers to compositions suitable for being diluted into a beverage and typically contain the soluble ingredients included in a beverage, only in a higher concentration, such as 2 times, 3 times, 4 time, 5 times, and most commonly, six times the concentration found in a ready to drink beverage. Concentrates can, however, be even more than 6 times as concentrated as a beverage.

As used in this disclosure, unless otherwise specified, the term "adding," "combining," and terms of similar character mean that the multiple ingredients or components referred to (e.g., one or more compounds disclosed herein, sweeteners, sweetness enhancers, etc.) are combined in any manner and in any order, with or without stirring.

As used herein the term "glucosyl" refers to the radical having the formula:

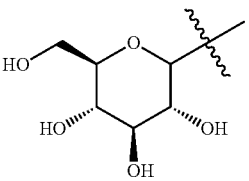 [SMILES: *C1O[C@H](CO)[C@@H](O)[C@H](O)[C@H]1O]

As used herein, the term "alkyl" refers to a linear, branched, or cyclic saturated group having one or more carbon atoms. Examples of alkyl groups include, but are not limited to, methyl, ethyl, propyl, butyl, pentyl, hexyl, heptyl, octyl, isopropyl, isobutyl, sec-butyl, tert-butyl, isopentyl, neopentyl, and the like.

As used herein, the term "alkenyl" refers to a linear, branched, or cyclic unsaturated group having two or more carbon atoms and one or more carbon-carbon double bonds. The one or more carbon-carbon double bonds can be internal (such as in 2-butenyl) or terminal (such as in 1-butenyl). Examples of alkenyl groups include, but are not limited to, ethenyl, 1-propenyl, 2-propenyl, 1-butenyl, 2-butenyl, butadienyl, pentenyl, pentadienyl, hexenyl, heptenyl, octenyl, octadienyl, octatrienyl, and the like.

As used herein, the term "alkynyl" refers to a linear or branched unsaturated group having two or more carbon atoms and one or more carbon-carbon triple bonds. The one or more carbon-carbon triple bonds can be internal (such as in 2-butynyl) or terminal (such as in 1-butynyl). Examples of alkynyl groups can include, but are not limited to, ethynyl, propyn-1-yl, propyn-3-yl, 1-butyn-1-yl, 1-butyn-4-yl, 2-butyn-1-yl, pentynyl, hexynyl, heptynyl, octynyl and the like.

Compositions

In certain embodiments, the present disclosure provides a composition comprising a compound of Formula I:

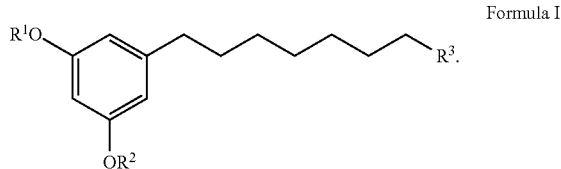

Formula I wherein $R^1$ and $R^2$ can be, independently, H or glucosyl; and $R^3$ is a $C_1$-$C_{15}$ linear, branched, or cyclic alkyl, alkenyl, or alkynyl group In some embodiments, $R^1$ and $R^2$ can both be hydrogen ("H") or both be glucosyl. In other embodiments, $R^1$ can be H and $R_2$ can be glucosyl, or vice versa.

In some embodiments, $R^3$ can be a linear, branched, or cyclic alkyl group. In some embodiments, $R^3$ can be a linear, branched, or cyclic alkenyl group. In some embodiments, $R^3$ can be a linear or branched alkynyl group.

In some embodiments, $R^3$ can be a linear, branched, or cyclic alkyl group. In some embodiments, the linear, branched, or cyclic alkyl group can be a $C_1$-$C_{15}$ alkyl group. In other embodiments, the linear, branched, or cyclic alkyl group can be a $C_2$-$C_{14}$ alkyl group, a $C_3$-$C_{13}$ alkyl group, a $C_4$-$C_{12}$ alkyl group, a $C_5$-$C_{11}$ alkyl group, a $C_6$-$C_{10}$ alkyl group, a $C_7$-$C_{10}$ alkyl group, or a $C_8$-$C_{10}$ alkyl group. In some embodiments, the linear, branched, or cyclic alkyl group can be a $C_1$ alkyl group, a $C_2$ alkyl group, a $C_3$ alkyl group, a $C_4$ alkyl group, a $C_5$ alkyl group, a $C_6$ alkyl group, a $C_7$ alkyl group, a $C_8$ alkyl group, a $C_9$ alkyl group, a $C_{10}$ alkyl group, a $C_{11}$ alkyl group, a $C_{12}$ alkyl group, a $C_{13}$ alkyl group, a $C_{14}$ alkyl group, or a $C_{15}$ alkyl group.

In some embodiments, $R^3$ can be a linear, branched, or cyclic alkenyl group. In some embodiments, the linear, branched, or cyclic alkenyl group can be a $C_2$-$C_{15}$ alkenyl group. In other embodiments, the linear, branched, or cyclic alkenyl group can be a $C_2$-$C_{14}$ alkenyl group, a $C_3$-$C_{13}$ alkenyl group, a $C_4$-$C_{12}$ alkenyl group, a $C_5$-$C_{11}$ alkenyl group, a $C_6$-$C_{10}$ alkenyl group, a $C_7$-$C_{10}$ alkenyl group, or a $C_8$-$C_{10}$ alkenyl group. In some embodiments, the linear, branched, or cyclic alkenyl group can be a $C_2$ alkenyl group, a $C_3$ alkenyl group, a $C_4$ alkenyl group, a $C_5$ alkenyl group, a $C_6$ alkenyl group, a $C_7$ alkenyl group, a $C_8$ alkenyl group, a $C_9$ alkenyl group, a $C_{10}$ alkenyl group, a $C_{11}$ alkenyl group, a $C_{12}$ alkenyl group, a $C_{13}$ alkenyl group, a $C_{14}$ alkenyl group, or a $C_{15}$ alkenyl group.

In some embodiments, $R^3$ can be a linear or branched alkynyl group. In some embodiments, the linear or branched alkynyl group can be a $C_2$-$C_{15}$ alkynyl group. In other embodiments, the linear or branched alkynyl group can be a $C_2$-$C_{14}$ alkynyl group, a $C_3$-$C_{13}$ alkynyl group, a $C_4$-$C_{12}$ alkynyl group, a $C_5$-$C_{11}$ alkynyl group, a $C_6$-$C_{10}$ alkynyl group, a $C_7$-$C_{10}$ alkynyl group, or a $C_8$-$C_{10}$ alkynyl group. In some embodiments, the linear or branched alkynyl group can be a $C_2$ alkynyl group, a $C_3$ alkynyl group, a $C_4$ alkynyl group, a $C_5$ alkynyl group, a $C_6$ alkynyl group, a $C_7$ alkynyl group, a $C_8$ alkynyl group, a $C_9$ alkynyl group, a $C_{10}$ alkynyl group, a $C_{11}$ alkynyl group, a $C_{12}$ alkynyl group, a $C_{13}$ alkynyl group, a $C_{14}$ alkynyl group, or a $C_{15}$ alkynyl group.

In certain embodiments, the compound of Formula I is a compound according to Formula II:

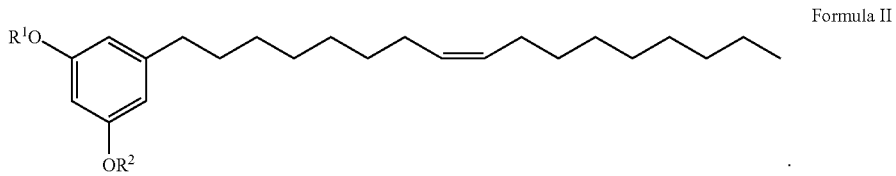

Formula II

In some embodiments, $R^1$ and $R^2$ can both be hydrogen ("H") or both be glucosyl. In other embodiments, $R^1$ can be H and $R_2$ can be glucosyl, or vice versa. In certain embodiments, the compound of Formula II, can be a compound according to Formula IIa wherein both $R^1$ and $R^2$ are H.

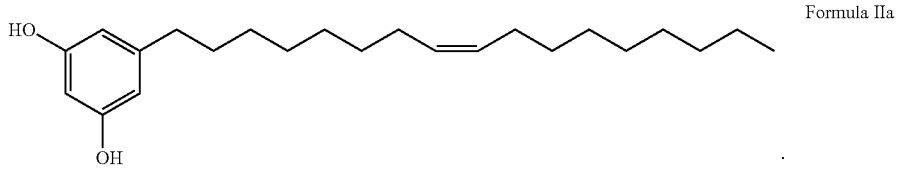 [SMILES: CCCCCCCC/C=C\CCCCCCCc1cc(O)cc(O)c1]

Formula IIa

In other embodiments, the compound of Formula I can be a compound according to Formula III:

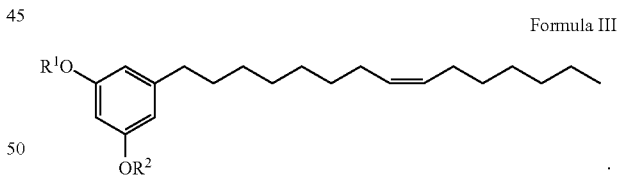

Formula III

In some embodiments, $R^1$ and $R^2$ can both be H or both be glucosyl. In other embodiments, $R^1$ can be H and $R_2$ can be glucosyl, or vice versa.

In certain embodiments, the present disclosure provides a composition comprising a compound of Formula IV:

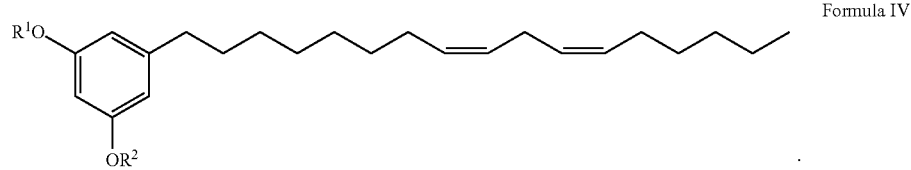

Formula IV

In some embodiments, $R^1$ and $R^2$ can both be H or both be glucosyl. In other embodiments, $R^1$ can be H and $R_2$ can be glucosyl, or vice versa.

In some embodiments, the composition can further comprise water.

In some embodiments, the compound of Formula I, the compound of Formula II, the compound of Formula IIa, the compound of Formula III, or the compound of Formula IV can be present in the composition in a concentration ranging from about 0.01 ppm to about 5,000 ppm. In other embodiments, the compound of Formula I, the compound of Formula II, the compound of Formula IIa, the compound of Formula III, or the compound of Formula IV can be present in a concentration ranging from about 0.1 ppm to about 4000 ppm, from about 0.1 ppm to about 3000 ppm, from about 0.1 ppm to about 2000 ppm, from about 0.1 ppm to about 1000 ppm, from about 1 ppm to about 900 ppm, from about 1 ppm to about 800 ppm, from about 1 ppm to about 700 ppm, from about 1 ppm to about 600 ppm, from about 1 ppm to about 500 ppm, from about 5 ppm to about 400 ppm, from about 5 ppm to about 300 ppm, from about 5 ppm to about 200 ppm, from about 10 ppm to about 180 ppm, from about 20 ppm to about 160 ppm, from about 30 ppm to about 140 ppm, from about 40 ppm to about 120 ppm, or from about 50 ppm to about 100 ppm.

In particular embodiments, the compound of Formula I, the compound of Formula II, the compound of Formula IIa, the compound of Formula III, or the compound of Formula IV can be present in a concentration of about 0.01 ppm, about 0.1 ppm, about 1 ppm, about 5 ppm, about 10 ppm, about 15 ppm, about 20 ppm, about 25 ppm, about 30 ppm, about 35 ppm, about 40 ppm, about 45 ppm, about 50 ppm, about 55 ppm, about 60 ppm, about 65 ppm, about 70 ppm, about 75 ppm, about 80 ppm, about 85 ppm, about 90 ppm, about 95 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 250 ppm, about 300 ppm, about 350 ppm, about 400 ppm, about 450 ppm, about 500 ppm, about 600 ppm, about 700 ppm, about 800 ppm, about 900 ppm, about 1000 ppm, about 2000 ppm, about 3000 ppm, about 4000 ppm or about 5000 ppm.

In some embodiments, the composition comprises water. In certain embodiments, the water is "treated water."

In certain embodiments, the present disclosure provides a composition comprising one or more compounds of Formula I. In some embodiments, the composition comprises a compound of Formula II, a compound of Formula III, a compound of Formula IV, or combinations thereof.

Composition Comprising a Sweetener

The composition of the present disclosure can further comprise a non-nutritive sweetener, which can be a natural or artificial non-nutritive sweetener. Non-nutritive sweeteners include, but are not limited to, a steviol glycoside, Lo Han Guo sweetener, rubusoside, siamenoside, monatin, curculin, glycyrrhizic acid, neohesperidin, dihydrochalcone, glycyrrhizin, glycyphyllin, phloridzin, trilobatin, phyllodulcin, brazzein, hernandulcin, osladin, polypodoside A, baiyunoside, pterocaryoside A and B, mukurozioside, thaumatin, monellin, mabinlins I and II, phlomisoside I, periandrin I, abrusoside A, and cyclocarioside I, mogroside IV, mogroside V, or combinations thereof.

In some embodiments, the non-nutritive sweetener in the composition can be a steviol glycoside. In some embodiments, the steviol glycoside can be stevioside, rebaudioside A, rebaudioside B, rebaudioside C, rebaudioside D, rebaudioside E, rebaudioside F, rebaudioside G rebaudioside H rebaudioside I, rebaudioside J, rebaudioside K, rebaudioside L, rebaudioside M, rebaudioside N, rebaudioside O, rebaudioside P, rebaudioside Q, steviolbioside, dulcoside A, or a mixture of any of the foregoing. In some embodiments, the steviol glycoside is rebaudioside A, rebaudioside D, stevioside, rebaudioside M, or any combinations thereof.

In particular embodiments, the steviol glycoside in the composition can be rebaudioside A. In other embodiments, the steviol glycoside in the composition can be rebaudioside D. In other embodiments, the steviol glycoside in the composition can be rebaudioside M. In other embodiments, the steviol glycoside in the composition can be rebaudioside F. And in other embodiments, the steviol glycoside can be rebaudioside J.

In other embodiments, the steviol glycoside in the composition can be mixture of rebaudiosides A and D, a mixture of rebaudiosides A and M, a mixture of rebaudiosides A, D, and M, a mixture of stevioside, rebaudioside A, and rebaudioside D, a mixture of rebaudiosides D, M, and stevioside, a mixture of stevioside, rebaudioside A, and rebaudioside M, a mixture of rebaudiosides J, A, and D, or a mixture of rebaudiosides J, A, D, and M.

The concentration of steviol glycoside in the composition can range from about 20 ppm to about 10,000 ppm. For example, if the composition is a beverage, steviol glycoside concentration can range from about 20 ppm to about 600 ppm total steviol glycoside content.

In other embodiments, such as when the composition is a beverage concentrate, steviol glycoside concentration can range from about 1 ppm to about 4800 ppm, from about 1 ppm to about 4500 ppm, from about 1 ppm to about 4200 ppm, from about 1 ppm to about 3900 ppm, from about 1 ppm to about 3600 ppm, from about 1 ppm to about 3300 ppm, from about 1 ppm to about 3000 ppm, from about 1 ppm to about 2700 ppm, from about 1 ppm to about 2400 ppm, from about 1 ppm to about 2100 ppm, from about 1 ppm to about 1800 ppm, from about 1 ppm to about 1500 ppm, from about 1 ppm to about 1200 ppm, from about 1 ppm to about 900 ppm, from about 1 ppm to about 600 ppm, or from about 1 ppm to about 300 ppm. In other embodiments, the steviol glycoside concentration can range from about 20 ppm to about 1000 ppm, from about 40 ppm to about 900 ppm, from about 60 ppm to about 800 ppm, from about 80 ppm to about 700 ppm, or from about 100 ppm to about 600 ppm. In particular embodiments, steviol glycoside concentration can be about 60 ppm, about 300 ppm, about 600 ppm, about 900 ppm, about 1200 ppm, about 1500 ppm, about 1800 ppm, about 2100 ppm, about 2400 ppm, about 2700 ppm, about 3000 ppm, about 3300 ppm, about 3600 ppm, about 3900 ppm, about 4200 ppm, about 4500 ppm, or about 4800 ppm. Typically, the concentration of steviol glycoside in the concentrate will be at least six times the concentration of the desired concentration of the steviol glycoside in a ready-to-drink beverage.

The foregoing notwithstanding, it is within the skill of the ordinarily skilled artisan to select an appropriate steviol glycoside concentration for the composition depending on the composition's intended use as well as the properties of the particular steviol glycoside.

The composition of the present disclosure can further comprise a nutritive sweetener. In some embodiments, the nutritive sweetener can be a natural nutritive sweetener. Exemplary natural nutritive sweeteners that can be included in the composition include any of those known in the art, for example, crystalline or liquid sucrose, fructose, glucose, dextrose, maltose, trehalose, fructo-oligosaccharides, glucose-fructose syrup from natural sources such as apple, chicory, and honey; high fructose corn syrup, invert sugar, maple syrup, maple sugar, honey, brown sugar molasses, cane molasses, such as first molasses, second molasses, blackstrap molasses, and sugar beet molasses; sorghum syrup, and mixtures thereof.

Other nutritive sweeteners suitable for use in the composition disclosed herein include, but are not limited to, sugar alcohols such as erythritol, sorbitol, mannitol, xylitol, lactitol, isomalt, malitol, tagatose, trehalose, galactose, rhamnose, cyclodextrin, ribulose, threose, arabinose, xylose, lyxose, allose, altrose, mannose, idose, lactose, maltose, isotrehalose, neotrehalose, palatinose or isomaltulose, erythrose, deoxyribose, gulose, talose, erythrulose, xylulose, psicose, turanose, cellobiose, glucosamine, mannosamine, fucose, fuculose, glucuronic acid, gluconic acid, gluconolactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, and mixtures thereof.

In some embodiments, the nutritive sweetener can be sucrose, high-fructose corn syrup, or a combination thereof.

The composition can also include one or more rare sugars, such as D-allose, D-psicose (also known as D-allulose), L-ribose, D-tagatose, L-glucose, L-fucose, L-arabinose, D-turanose, D-leucrose, and mixtures thereof. In particular embodiments, the composition can comprise D-psicose.

The composition of the present disclosure can also contain other additional ingredients, such as a solubilizing or a bulking agent. Exemplary solubilizing or bulking agent includes maltodextrin, dextrose-maltodextrin blends, hydroxypropylmethyl cellulose, carboxymethyl cellulose, polyvinylpyrrolidone, and combinations thereof.

The composition of the present disclosure can also contain an artificial sweetener, a sweetness enhancer, and/or a binding or an anti-caking agent.

Exemplary artificial sweeteners include, but are not limited to, saccharin, cyclamate, aspartame, neotame, advantame, acesulfame potassium, sucralose, and mixtures thereof.

Suitable sweetness enhancers include any of those known in the art. Exemplary sweetness enhancers include, but are not limited to sugar alcohol sweetness enhancer (such as erythritol, sorbitol, mannitol, xylitol, lactitol, isomalt, malitol, and mixtures thereof), or rare sugar sweetness enhancer (D-psicose, D-allose, L ribose, D-tagatose, L glucose, L-fucose, L-arabinose, D-turanose, D-leucrose, and mixtures thereof). In certain embodiments, any of the steviol glycosides described herein can function as a sweetness enhancer, rather than as a sweetener. In particular embodiments, the sweetness enhancer can be rebaudioside J.

In some embodiments, the sweetness enhancer can be a salt based sweetness enhancer (such as NaCl or potassium sorbate) or a benzoic acid based sweetness enhancer (such as potassium benzoate).

Beverages

In certain embodiments, the composition described herein can be a beverage. In some embodiments, the beverage is a ready-to-drink beverage. In some embodiments, the beverage can have fewer than about 200 calories per 8 oz serving, fewer than about 150 calories per 8 oz serving, fewer than about 100 calories per 8 oz serving, fewer than about 70 calories per 8 oz serving, fewer than about 50 calories per 8 oz serving, fewer than about 10 calories per 8 oz serving, or fewer than about 5 calories per 8 oz serving.

In some embodiments, the beverage can comprise a compound of Formula I, a compound of Formula II, a compound of Formula IIa, a compound of Formula III, or a compound of Formula IV in a concentration ranging from about 0.01 ppm to about 1000 ppm. In other embodiments, the beverage can comprise a compound of Formula I, a compound of Formula II, a compound of Formula IIa, a compound of Formula III, or a compound of Formula IV in a concentration ranging from about 0.1 ppm to about 1000 ppm, from about 1 ppm to about 900 ppm, from about 1 ppm to about 800 ppm, from about 1 ppm to about 700 ppm, from about 1 ppm to about 600 ppm, from about 1 ppm to about 500 ppm, from about 5 ppm to about 400 ppm, from about 5 ppm to about 300 ppm, from about 5 ppm to about 200 ppm, from about 10 ppm to about 180 ppm, from about 20 ppm to about 160 ppm, from about 30 ppm to about 140 ppm, from about 40 ppm to about 120 ppm, or from about 50 ppm to about 100 ppm.

In particular embodiments, the beverage can comprise a compound of Formula I, a compound of Formula II, a compound of Formula IIa, a compound of Formula III, or a compound of Formula IV in a concentration of about 0.01 ppm, about 0.1 ppm, about 1 ppm, about 5 ppm, about 10 ppm, about 15 ppm, about 20 ppm, about 25 ppm, about 30 ppm, about 35 ppm, about 40 ppm, about 45 ppm, about 50 ppm, about 55 ppm, about 60 ppm, about 65 ppm, about 70 ppm, about 75 ppm, about 80 ppm, about 85 ppm, about 90 ppm, about 95 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 250 ppm, about 300 ppm, about 350 ppm, about 400 ppm, about 450 ppm, about 500 ppm, about 600 ppm, about 700 ppm, about 800 ppm, about 900 ppm, or about 1000 ppm.

In certain embodiments, the beverage comprises one or more compounds of Formula I. In some embodiments, the beverage comprises a compound of Formula II, a compound of Formula III, a compound of Formula IV, or a combination thereof.

In certain embodiments, the beverage further comprises an acidulant and, optionally, a flavorant.

Suitable acidulants include, but are not limited to phosphoric acid, citric acid, malic acid, tartaric acid, lactic acid, formic acid, ascorbic acid, fumaric acid, gluconic acid, succinic acid, maleic acid, adipic acid, and mixtures thereof.

Suitable flavorants include, but are not limited to a cola flavorant, a tea flavorant, a caramel flavorant, a coffee flavorant, a citrus flavorant (including, but not limited to, a lemon flavorant, a lime flavorant, an orange flavorant, a grapefruit flavorant, a mandarin orange flavorant, a tangerine flavorant, a tangelo flavorant, or a combination of any of the foregoing), an herbal flavorant, a berry flavoring (such as a flavorant derived from one or more of Barbados cherry, bearberry, blackberry, blueberry, boysenberry, cherry, choke cherry, cloudberry, cranberry, current, date, dewberry, elderberry, grape, gooseberry, huckleberry, loganberry, olallieberry, mulberry, raisin, plains berry, prairie berry, raspberry, saskatoon berry, salmonberry, seabuckthorn berry, sloe berry, strawberry, thimbleberry, thornberry, wineberry, whortleberry, or a combination of any of the foregoing), a botanical flavorant (such as one or more flavors derived from a part of a plant other than the fruit, including flavors derived from essential oils and extracts of nuts, bark, roots and leaves along with synthetically prepared flavors made to simulate botanical flavors derived from natural sources), and mixtures thereof.

In certain embodiments, and as discussed above, the beverage can comprise a non-nutritive sweetener. In particular embodiments, the non-nutritive sweetener can be selected from the group consisting of a steviol glycoside, Lo Han Guo sweetener, rubusoside, siamenoside, monatin, curculin, glycyrrhizic acid, neohesperidin, dihydrochalcone, glycyrrhizin, glycyphyllin, phloridzin, trilobatin, phyllodulcin, brazzein, hernandulcin, osladin, polypodoside A, baiyunoside, pterocaryoside A and B, mukurozioside, thaumatin, monellin, mabinlins I and II, phlomisoside I, periandrin I, abrusoside A, and cyclocarioside I, mogroside IV, mogroside V, or combinations thereof.

In some embodiments, the non-nutritive sweetener in the beverage can be a steviol glycoside. In some embodiments, the steviol glycoside can be stevioside, rebaudioside A, rebaudioside B, rebaudioside C, rebaudioside D, rebaudioside E, rebaudioside F, rebaudioside G, rebaudioside H, rebaudioside I, rebaudioside J, rebaudioside K, rebaudioside L, rebaudioside M, rebaudioside N, rebaudioside O, rebaudioside P, rebaudioside Q, steviolbioside, dulcoside A, or a mixture of any of the foregoing. In some embodiments, the steviol glycoside is rebaudioside A, rebaudioside D, stevioside, rebaudioside M, or any combinations thereof.

In particular embodiments, the steviol glycoside in the beverage is rebaudioside A. In other embodiments, the steviol glycoside in the beverage is rebaudioside D. In other embodiments, the steviol glycoside in the beverage is rebaudioside M. In other embodiments, the steviol glycoside in the beverage is rebaudioside F. In other embodiments, the steviol glycoside in the beverage is a mixture of rebaudiosides A and D. In other embodiments, the steviol glycoside in the beverage is a mixture of rebaudiosides A and M. In still further embodiments, the steviol glycoside in the beverage is a mixture of rebaudiosides A, D, and M. In still further embodiments, the steviol glycoside in the beverage is a mixture of stevioside, rebaudioside A, and rebaudioside D. In other embodiments, the steviol glycoside in the beverage is a mixture of stevioside, rebaudioside A, and rebaudioside M. In yet another embodiment, the steviol glycoside is a mixture of rebaudiosides D, M, and stevioside.

In certain embodiments, the non-nutritive sweetener can be present in the beverage in a concentration ranging from about 1 ppm to about 800 ppm, from about 1 ppm to about 750 ppm, from about 1 ppm to about 700 ppm, from about 1 ppm to about 650 ppm, from about 1 ppm to about 600 ppm, from about 1 ppm to about 550 ppm, from about 1 ppm to about 500 ppm, from about 1 ppm to about 450 ppm, from about 1 ppm to about 400 ppm, from about 1 ppm to about 350 ppm, from about 1 ppm to about 300 ppm, from about 1 ppm to about 250 ppm, from about 1 ppm to about 200 ppm, from about 1 ppm to about 150 ppm, from about 1 ppm to about 100 ppm, or from about 1 ppm to about 50 ppm, depending upon the particular non-nutritive sweetener(s) being used and the desired level of sweetness in the beverage. In particular embodiments, the non-nutritive sweetener can be present in the beverage in a concentration of about 1 ppm, about 10 ppm, about 50 ppm, about 100 ppm, about 150 ppm, about 200 ppm, about 250 ppm, about 300 ppm, about 350 ppm, about 400 ppm, about 450 ppm, about 500 ppm, about 550 ppm, about 600 ppm, about 650 ppm, about 700 ppm, about 750 ppm, or about 800 ppm.

In certain embodiments, the beverage can also include one or more salts. The salt concentration can range from about 100 ppm to about 1000 ppm, or from about 200 ppm to about 800 ppm. In particular embodiments, the salt can be sodium chloride. In certain embodiments, the beverage composition can be completely or substantially salt free.

In some embodiments, the beverage can further comprise caffeine. In other embodiments, the beverage can be substantially caffeine free, or is caffeine free.

In certain embodiments, the beverage can further comprise other ingredients such as antioxidants, food grade acids, and food grade bases. Other beverage components such as colors, preservatives, carbon dioxide, buffering salts, and the like, can also be present.

Suitable food grade acids are water soluble organic acids and their salts and include, for example, phosphoric acid, sorbic acid, ascorbic acid, benzoic acid, citric acid, tartaric acid, propionic acid, butyric acid, acetic acid, succinic acid, glutaric acid, maleic acid, malic acid, valeric acid, caproic acid, malonic acid, aconitic acid, potassium sorbate, sodium benzoate, sodium citrate, amino acids, and combinations of any of them. Such acids are suitable for adjusting the pH of the food or beverage.

Suitable food grade bases are sodium hydroxide, potassium hydroxide, and calcium hydroxide. Such bases also are suitable for adjusting the pH of a food or beverage.

In some embodiments, the beverage can be a carbonated beverage, a non-carbonated beverage, a fountain beverage, a frozen beverage, a frozen carbonated beverage, a fruit juice, a fruit juice-flavored drink, a fruit-flavored drink, a cola beverage, a sports drink, an energy drink, a fortified/enhanced water drink, a flavored water, a soy drink, a vegetable drink, a grain-based drink, a malt beverage, a fermented drink, a yogurt drink, kefir, a coffee beverage, a tea beverage, a dairy beverage, a smoothie drink, a caffeinated energy drink, or an alcoholic beverage.

In some embodiments, the beverage can be a cola beverage. In other embodiments, the cola beverage can comprise cola flavoring and a non-nutritive sweetener selected from the group consisting of a steviol glycoside, Lo Han Guo sweetener, rubusoside, siamenoside, monatin, curculin, glycyrrhizic acid, neohesperidin, dihydrochalcone, glycyrrhizin, glycyphyllin, phloridzin, trilobatin, phyllodulcin, brazzein, hernandulcin, osladin, polypodoside A, baiyunoside, pterocaryoside A and B, mukurozioside, thaumatin, monellin, mabinlins I and II, phlomisoside I, periandrin I, abrusoside A, and cyclocarioside I, mogroside IV, mogroside V, or combinations thereof.

In some embodiments, the non-nutritive sweetener can be a steviol glycoside. In particular embodiments, the steviol glycoside can be selected from the group consisting of stevioside, rebaudioside A, rebaudioside B, rebaudioside C, rebaudioside D, rebaudioside E, rebaudioside F, rebaudioside G rebaudioside H rebaudioside I, rebaudioside J, rebaudioside K, rebaudioside L, rebaudioside M, rebaudioside N, rebaudioside O, rebaudioside P, rebaudioside Q, steviolbioside, dulcoside A, and combinations thereof. In some embodiments, the steviol glycoside is rebaudioside A, rebaudioside D, stevioside, rebaudioside M, or any combinations thereof.

In particular embodiments, the steviol glycoside in the beverage can be rebaudioside A. In other embodiments, the steviol glycoside in the beverage can be rebaudioside D. In other embodiments, the steviol glycoside in the beverage can be rebaudioside M. In other embodiments, the steviol glycoside in the beverage can be rebaudioside F. And in other embodiments, the steviol glycoside in the beverage can be rebaudioside J.

In other embodiments, the steviol glycoside in the beverage can be mixture of rebaudiosides A and D, a mixture of rebaudiosides A and M, a mixture of rebaudiosides A, D, and M, a mixture of stevioside, rebaudioside A, and rebaudioside D, a mixture of rebaudiosides D, M, and stevioside, a mixture of stevioside, rebaudioside A, and rebaudioside M, a mixture of rebaudiosides J, A, and D, or a mixture of rebaudiosides J, A, D, and M.

In particular embodiments, the beverage can be a carbonated cola beverage, containing, amongst other things, water, sweetener, kola nut extract and/or other flavorings, caramel coloring, phosphoric acid, optionally caffeine, and optionally other ingredients. Additional and alternative suitable ingredients will be recognized by those skilled in the art given the benefit of this disclosure.

Carbonation in the form of carbon dioxide can be added for effervescence. Any of the techniques and carbonating equipment known in the art for carbonating beverages can be employed. Carbon dioxide can enhance beverage taste and appearance and can aid in safeguarding the beverage purity by inhibiting and/or destroying objectionable bacteria. In certain embodiments, for example, the beverage can have a $CO_2$ level up to about 4.0 volumes carbon dioxide. Other embodiments can have, for example, from about 0.5 to about 5.0 volumes of carbon dioxide. As used herein, one volume of carbon dioxide refers to the amount of carbon dioxide absorbed by a given quantity of a given liquid, such as water, at 60° F. (16° C.) and one atmospheric pressure. A volume of gas occupies the same space as does the liquid by which it is dissolved. The carbon dioxide content can be selected by those skilled in the art based on the desired level of effervescence and the impact of the carbon dioxide on the taste or mouthfeel of the beverage.

Beverages can have any of numerous different specific formulations or constituents. The formulation of a beverage can vary, depending upon such factors as the product's intended market segment, its desired nutritional characteristics, flavor profile, and the like. Thus further ingredients can be added to the formulation of a particular beverage. Further ingredients include, but are not limited to, one or more additional sweeteners in addition to any sweetener already present, electrolytes, vitamins, flavor enhancers, carbonation, preservatives, or any combination thereof. These ingredients can be added to any of the beverage compositions to vary the taste, mouthfeel, and/or nutritional values of the beverage composition.

Preservatives can be used in certain food or beverages. As used here, the term "preservatives" include all suitable preservatives approved for use in beverage compositions, including, without limitation, such known chemical preservatives as benzoates, such as sodium, calcium, and potassium benzoate, sorbates, such as sodium, calcium, and potassium sorbate, citrates, such as sodium citrate and potassium citrate, polyphosphates, such as sodium hexametaphosphate (SHMP), and mixtures thereof, and antioxidants such as ascorbic acid, EDTA, BHA, BHT, TBHQ, dehydroacetic acid, dimethyldicarbonate, ethoxyquin, heptylparaben, and combinations thereof. Preservatives can be used in amounts not exceeding mandated maximum levels under applicable laws and regulations.

Beverage Concentrates

In certain embodiments, the composition described herein can be a beverage concentrate. In some embodiments, the beverage concentrate can comprise a compound of Formula I, a compound of Formula II, a compound of Formula IIa, a compound of Formula III, or a compound of Formula IV in a concentration ranging from about 1000 ppm to about 5,000 ppm. In other embodiments, the beverage concentrate can comprise a compound of Formula I in a concentration ranging from about 1000 ppm to about 4000 ppm, from about 1000 ppm to about 3000 ppm, from about 1000 ppm to about 2000 ppm, from about 2000 ppm to about 5000 ppm, from about 2000 ppm to about 4000 ppm, from about 2000 ppm to about 3000 ppm, from about 3000 ppm to about 5000 ppm, from about 3000 ppm to about 4000 ppm, and from about 4000 ppm to about 5000 ppm.

In particular embodiments, the beverage concentrate can comprise a compound of Formula I in a concentration of about 1000 ppm, about 1100 ppm, about 1200 ppm, about 1300 ppm, about 1400 ppm, about 1500 ppm, about 1600 ppm, about 1700 ppm, about 1800 ppm, about 1900 ppm, about 2000 ppm, about 2100 ppm, about 2200 ppm, about 2300 ppm, about 2400 ppm, about 2500 ppm, about 2600 ppm, about 2700 ppm, about 2800 ppm, about 2900 ppm, about 3000 ppm, about 3100 ppm, about 3200 ppm, about 3300 ppm, about 3400 ppm, about 3500 ppm, about 3600 ppm, about 3700 ppm, about 3800 ppm, about 3900 ppm, about 4000 ppm, about 4100 ppm, about 4200 ppm, about 4300 ppm, about 4400 ppm, about 4500 ppm, about 4600 ppm, about 4700 ppm, about 4800 ppm, about 4900 ppm, or about 5000 ppm.

In certain embodiments, the beverage concentrate comprises one or more compounds of Formula I. In some embodiments, the beverage concentrate comprises a compound of Formula II, a compound of Formula III, a compound of Formula IV, or combinations thereof.

Additional and alternative suitable ingredients for a beverage concentrate can be readily recognized by those skilled in the art. For example, one or more salts can be included in the beverage concentrate in a concentration ranging from about 600 ppm to about 6000 ppm, or from about 1200 ppm to about 2400 ppm. In certain embodiments, beverage concentrates can be completely or substantially salt free.

In some embodiments, the beverages described herein, and in particular, so called "ready-to-drink beverages" can be prepared from the beverage concentrate by adding a certain volume of water to the concentrate. For example, a ready-to-drink beverage can be prepared from the beverage concentrate by combining 1 part concentrate with about 3 to about 7 parts water. In one embodiment, the ready-to-drink beverage can be prepared by combining 1 part concentrate with 5 parts water.

In certain embodiments, the present disclosure also includes a kit comprising the beverage concentrate. In addition to the concentrate, the kit can comprise any of the additional elements required for preparing a concentrate, or beverage (from the concentrate, such as flavorings, acids, antioxidants, etc., exclusive of, or optionally including, any additional water that might be required to dilute the concentrate. The kit can further include instructions for preparing a beverage. In certain embodiments the kit can be provided to a beverage bottler or to a beverage retailer for preparing beverages on a commercial scale. When provided to a retailer, the kit can contain instructions for preparing beverages using a post-mix delivery system, such as calibration instructions, etc.

The present disclosure further include kits comprising one or more pods, cartridges, or other containers adapted to store a sufficient quantity of the beverage concentrate to prepare a single- or multiple-serve beverage from the concentrate. In some embodiments, the kit can further include a beverage-dispensing apparatus adapted to receive the one or more pods or cartridges, wherein, upon activation by a user, the beverage dispensing apparatus combines the contents of one pod or cartridge with an appropriate volume of optionally carbonated water, or other diluent, to provide a single- or multiple-serve beverage. In still further embodiments, the kit can include instructions for operating the beverage-dispensing apparatus, cleaning the apparatus, and refilling and/or recycling spent pods or cartridges. In certain embodiments, the beverage-dispensing apparatus can be suitable for use in a commercial setting, such as a retail environment. In other embodiments, the beverage dispensing apparatus can be suitable for home or "on the go" use. Pods and cartridges adapted to store a beverage concentrate for preparing single- or multiple-serve beverages as well as beverage dispensing apparatuses adapted to receive pods and cartridges for preparing a single- or multiple-serve beverage, both for home and commercial use, are known to those of ordinary skill in the art.

Method for Improving Mouthfeel

In another embodiment, the present disclosure provides a method for improving mouthfeel. In some embodiments, the method can be a method for improving mouthfeel of a beverage, the method comprising adding compound of Formula I:

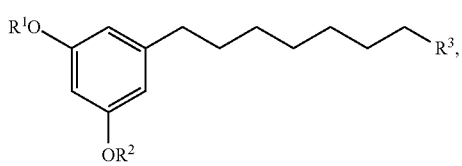

Formula I wherein $R^1$, $R^2$, and $R^3$ are as defined herein, to a beverage or beverage concentrate.

In some embodiments, the method for improving mouthfeel of a beverage comprises adding a compound of Formula II:

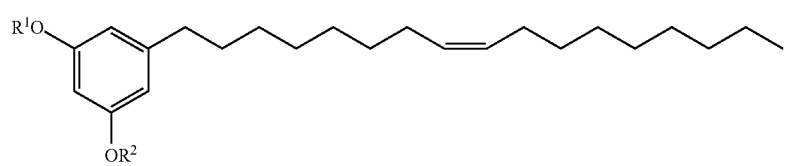

Formula II wherein $R^1$ and $R^2$ are as defined herein, to a beverage or beverage concentrate. In certain embodiments, the compound of Formula II, can be a compound according to Formula IIa wherein both $R^1$ and $R^2$ are H.

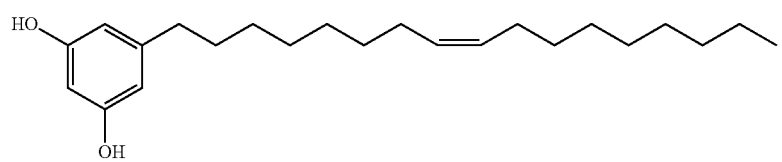

Formula IIa

In some embodiments, the method for improving mouthfeel of a beverage comprises adding to a beverage or beverage concentrate a compound of Formula III:

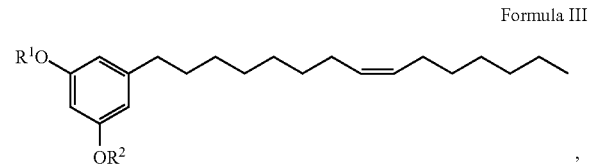

Formula III wherein $R^1$ and $R^2$ are as defined herein, to a beverage or beverage concentrate.

In some embodiments, the method for improving mouthfeel of a beverage comprises adding to a beverage or beverage concentrate a compound of Formula IV:

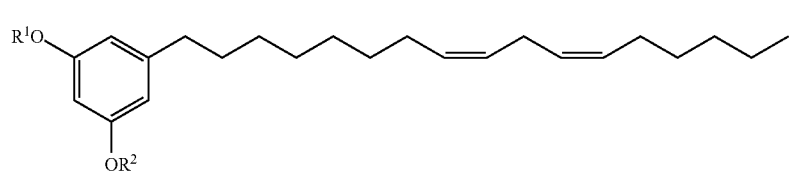

Formula IV wherein $R^1$ and $R^2$ are as defined herein, to a beverage or beverage concentrate.

In some embodiments, the method for improving mouthfeel comprises adding the compound of Formula I, the compound of Formula II, the compound of Formula IIa, the compound of Formula III, or the compound of Formula IV, to a beverage or a beverage concentrate in an amount sufficient to achieve a final concentration in the beverage of about 0.01 ppm to about 1000 ppm, about 0.1 ppm to about 1000 ppm, about 1 ppm to about 900 ppm, about 1 ppm to about 800 ppm, about 1 ppm to about 700 ppm, about 1 ppm to about 600 ppm, about 1 ppm to about 500 ppm, about 5 ppm to about 400 ppm, about 5 ppm to about 300 ppm, about 5 ppm to about 200 ppm, about 10 ppm to about 180 ppm, about 20 ppm to about 160 ppm, about 30 ppm to about 140 ppm, about 40 ppm to about 120 ppm, or from about 50 ppm to about 100 ppm.

In some embodiments, the method for improving mouthfeel of a beverage comprises adding to a beverage or beverage concentrate the compound of Formula I, the compound of Formula II, the compound of Formula IIa, the compound of Formula III, or the compound of Formula IV, in an amount sufficient to achieve a final concentration in the beverage of about 0.01 ppm, about 0.1 ppm, about 1 ppm, about 5 ppm, about 10 ppm, about 15 ppm, about 20 ppm, about 25 ppm, about 30 ppm, about 35 ppm, about 40 ppm, about 45 ppm, about 50 ppm, about 55 ppm, about 60 ppm, about 65 ppm, about 70 ppm, about 75 ppm, about 80 ppm, about 85 ppm, about 90 ppm, about 95 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 250 ppm, about 300 ppm, about 350 ppm, about 400 ppm, about 450 ppm, about 500 ppm, about 600 ppm, about 700 ppm, about 800 ppm, about 900 ppm, or about 1000 ppm.

In some embodiments, the method for improving mouthfeel of a beverage comprises adding to a beverage or beverage concentrate one or more compounds of Formula I. In some embodiments, the method for improving mouthfeel of a beverage comprises adding to a beverage or beverage concentrate a compound of Formula II, a compound of Formula III, a compound of Formula IV, or combinations thereof.

In another embodiment, the present disclosure provides a method for improving mouthfeel of a beverage comprising adding to a beverage or beverage concentrate an extract of the *Embelia philippinensis* plant. In some embodiments, the extract of the *Embelia philippinensis* plant comprises a compound of Formula I:

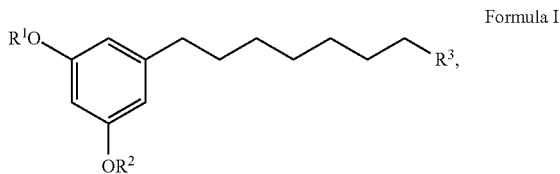

Formula I wherein $R^1$, $R^2$, and $R^3$ are as defined herein.

In some embodiments, the extract of the *Embelia phihppinensis* plant comprises a compound of Formula II:

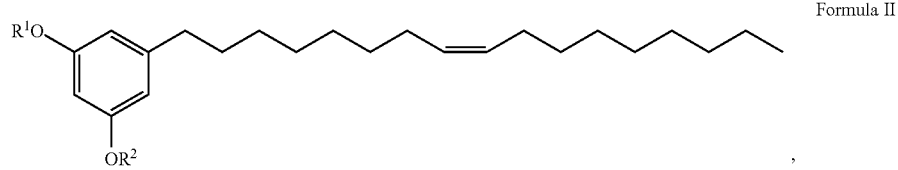

Formula II wherein $R^1$ and $R^2$ are as defined herein. In certain embodiments, the compound of Formula II, can be a compound according to Formula IIa wherein both $R^1$ and $R^2$ are H.

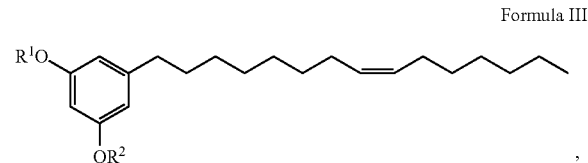

Formula IIa

In some embodiments, the extract of the *Embelia philippinensis* plant comprises a compound of Formula III:

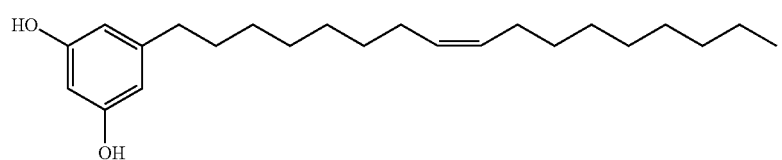

Formula III wherein $R^1$ and $R^2$ are as defined herein.

In some embodiments, the extract of the *Embelia phihppinensis* plant comprises a compound of Formula IV:

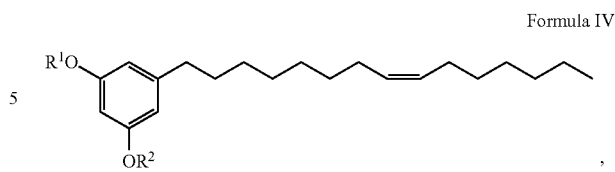

Formula IV wherein $R^1$ and $R^2$ are as defined herein.

Method of Making Compositions

The compositions of the present disclosure can be prepared using suitable methods known to those of ordinary skill in the art. For example, in certain embodiments, the compositions can be prepared by adding a sufficient amount of the compound of Formula I in water, or other appropriate diluent. In some embodiments, the compositions can be prepared by adding a sufficient amount of the compound of Formula II in water, or other appropriate diluent. In some embodiments, the compositions can be prepared by adding a sufficient amount of one or more of the compound of Formula II, the compound of Formula III, the compound of Formula IV, or combinations thereof, in water, or other appropriate diluent. The adding of ingredients can be effected by any appropriate means that are known in the art. For example, the compositions can be prepared by dissolving one of the ingredients in water, or other appropriate diluent, and then adding the remaining ingredients to the mixture. Alternatively, the compositions can be prepared by dissolving any two or more ingredients in water, or other appropriate diluent, and then adding the remaining ingredients to the mixture in any order.

In various embodiments, the compositions can be prepared by adding each ingredient to the water, or other appropriate diluent, at the same time or individually in any order.

In some embodiments, the compositions can be prepared by adding the ingredients to water, or other appropriate diluent, at any temperature required to result in dissolution of the various ingredients. For example, the ingredients can be added to water, or other appropriate diluent, at a temperature ranging from about 15° C. to about 100° C., from about 18° C. to about 80° C., from about 18° C. to about 60° C., from about 18° C. to about 40° C., or from about 18° C. to about 30° C. In particular embodiments, the ingredients can be added to water, or other appropriate diluent, at a temperature of about 18° C., about 19° C., about 20° C., about 21° C., about 22° C., about 23° C., about 24° C., about 25° C., about 26° C., about 27° C., about 28° C., about 29° C., or about 30° C.

During preparation, the compositions can be mixed at high or low shear and at any of the identified temperatures, as necessary, to induce or aid dissolution. It is within the skill of the ordinary skilled artisan to identify the appropriate shear level and/or temperature for a given mixture to obtain the results described herein.

Method of Preparing Compounds of Formula I

The compounds of Formula I can be prepared using suitable methods known to those of ordinary skill in the art. For example, in certain embodiments, the compounds of Formula I can be extracted from the *Embelia philippinensis* plant. In some embodiments, the compounds of Formula I can be extracted from the *Embelia philippinensis* plant using a solvent to obtain an extract concentrate. In some embodiments, the solvent can be an alcoholic solvent. Suitable alcoholic solvents include, but are not limited to, methanol, ethanol, 1-propanol, isopropanol, 1-butanol, 2-butanol, sec-butanol, tert-butanol, pentanol, and the like.

In some embodiments, a compound of Formula I can be further isolated from the extract concentrate. In some embodiments, the compound of Formula I can be isolated from the extract concentrate using one or more purification methods. In some embodiments, the one or more purification methods include, but are not limited to, filtration, crystallization, and chromatographic separation.

In another embodiment, the present disclosure provides a method of isolating a compound of Formula I from the *Embelia phihppinensis* plant,

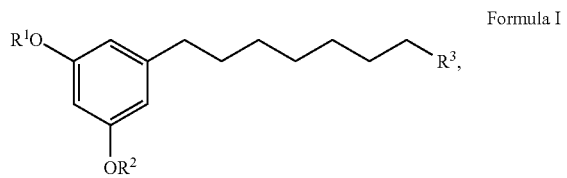

Formula I wherein $R^1$ and $R^2$ are each, independently, H or glucosyl; and $R^3$ is a $C_1$-$C_{15}$ linear, branched, or cyclic alkyl, alkenyl, or alkynyl group;
the method comprising
(a) mixing the *Embelia phihppinensis* plant with an alcoholic solvent;
(b) separating the alcoholic solvent from the mixture;
(c) concentrating the alcoholic solvent to obtain an alcohol extract concentrate; and
(d) isolating the compound of Formula I from the alcohol extract concentrate.

Food Products

The composition of present disclosure can also be used in food products. Suitable food products include, but are not limited to, oatmeal, cereal, baked goods, cookies, crackers, cakes, brownies, breads, snack foods (such as snack bars), potato or tortilla chips, popcorn, rice cakes, and other grain-based food products.

In some embodiments, the composition of the present disclosure can also be suitable for use in cooking, baking (such as for use in cookies, cakes, pies, brownies, breads, granola bars, etc.), for preparing sweetened toppings, such as icings, and for use in jellies, jams, preserves, oat-based products, and the like. It is similarly suitable for use in frozen dairy products, such as ice cream, as well as in whipped toppings.

EXAMPLES

Example 1—Isolation and Purification of the Compound of Formula IIa

The compound of Formula IIa was isolated and purified as follows. Leaves and stems from a *Embelia phihppinensis* plant were cleaned, washed, and dried. The leaves were then crushed, macerated with 100% methanol, and soaked overnight. The methanol was separated from the crushed leaves via filtration and was subsequently concentrated using a rotary evaporator to form an extract concentrate ("extract concentrate"). About 250 grams ("g") of the extract concentrate was then dissolved in methanol and filtered. The resulting methanol solution was then subjected to silica gel chromatography to obtain thirteen fractions. Fractions 5-7 were combined and the components present in the combined fractions were further purified using a reverse phase MPLC Buchi® C620 instrument with a Daiso ODS-C18 80×500 mm and 40-60 μm chromatography column, a 100 mL/min flow rate, and an acetonitrile-water gradient of 50%-50% for 15 min., 50%-90% for 15 min., 90%-100% for 40 min., and 100%-100% for 40 min. to obtain fractions 1a-18a. Fraction 12a was further separated by sephadex LH-20 chromatography with dichloromethane-methanol (1:1, V/V) to obtain fractions 1b-10b. Fractions 5b, 6b, and 7b were then combined and further separated using a Pre-HPLC SHIMADZU® instrument with a Phenomenex luna(2) C18 50×250 mm and 10 μm column, an 80 mL/min flow rate, and a water(10 mM $NH_4HCO_3$)-acetonitrile gradient of 5%-35% for 20 min. to obtain fractions 1c-5c. Fraction 4c was further separated using a Waters® SFC 350 preparative Supercritical Fluid Chromatography (SFC) instrument with a ChiralPak® AD, 50×250 mm and 10 μm column, a 200 g/min flow rate, and a carbon dioxide-isopropyl alcohol gradient of 35%-35% for 6 min. to obtain 1.43 g of the compound of Formula IIa with 97.09% purity.

Example 2—Sensory Evaluation Study

A sensory test was conducted to show that the compound of Formula IIa,

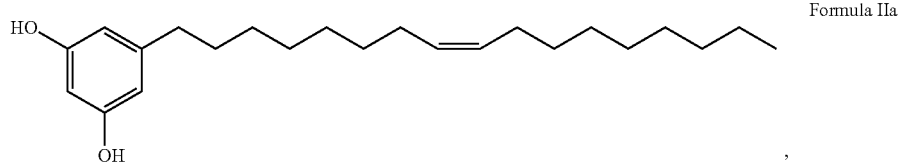 [SMILES: CCCCCCCC/C=C\CCCCCCCc1cc(O)cc(O)c1]

Formula IIa

, enhances mouthfeel.

Aqueous samples containing the compound of Formula IIa were prepared as follows.

A mock diet beverage base was prepared by adding 0.4070 g acesulfame potassium ("AceK"), 2.794 g sucralose, 0.1966 g anhydrous citric acid, 1.840 g 80% phosphoric acid, and 100 ppm sodium benzoate to 4000 ml treated water and stirring the mixture. Sample 1 was prepared by adding a sufficient quantity of the compound of Formula IIa to a portion of the mock diet beverage base to achieve a concentration of 50 ppm, and stirring the mixture. Sample 2 was prepared by adding a sufficient quantity of the compound of Formula IIa to a portion of the mock diet beverage base to achieve a concentration of 100 ppm, and stirring the mixture. The remaining mock diet beverage base was used as a control sample.

Sixteen expert tasters were then asked to evaluate the viscosity of Sample 1 and Sample 2 as compared to the control sample. The expert tasters wore nose clips and cleansed their palates three times with water prior to tasting. After cleansing their palates, the tasters were presented with two samples: the control sample and either Sample 1 or Sample 2. Both samples were blind coded. Samples were evaluated according to the following protocol: choose a first sample and swirl it in the mouth for 10 seconds; spit the sample out; wait 10 seconds; swirl the second sample in the mouth for 10 seconds; spit it out; and then choose which sample had a higher viscosity. Following these first evaluations, the expert tasters rinsed their mouths six times with water, and waited 5 minutes before repeating the process with a second sample set that included the other Sample (i.e., Sample 1 or 2) and the control sample. Each sample set was tested in triplicate. The results are shown below in Table 1.

TABLE 1

| Sample | Choice | P Value |
|---|---|---|
| Sample 1 | 25 | p = 0.28 |
| Control | 20 | |
| Sample 2 | 27 | p = 0.04 |
| Control | 15 | |

As shown in Table 1, Sample 2, which contained 100 ppm of the compound of Formula IIa, exhibited significantly more viscosity than the control sample. Sample 1, which contained 50 ppm of the compound of Formula IIa, exhibited directionally higher viscosity than the control sample.

Example 3—Sensory Evaluation Study for Mid-Calorie Cola Beverage

A sensory test was conducted to show that the compound of Formula IIa enhances the mouthfeel of a mid-calorie cola beverage. Aqueous samples were prepared as follows.

A mid-calorie cola beverage base was prepared by adding 285.5 g sucrose, 1.4 g rebaudioside A, 1.0 g sodium benzoate, and 2.0 g 80% phosphoric acid to 10 L of water and stirring the mixture. Sample 1 was prepared by adding a sufficient quantity of the compound of Formula IIa to a portion of the mid-calorie cola beverage base to achieve a concentration of 100 ppm, and stirring the mixture. The remaining mid-calorie cola beverage base was used as a control sample.

Three tasters were then asked to evaluate the mouthfeel properties of Sample 1 as compared to the control sample in a blind taste test and to evaluate whether Sample 1 or the control sample had a higher or lower mouthfeel compared to each other. For purposes of this evaluation, "higher mouthfeel" meant a mouthfeel more like a beverage sweetened with sugar, and "lower mouthfeel" indicated a mouthfeel more like a beverage sweetened with only a high intensity non-nutritive sweetener. The results are shown below in Table 2.

TABLE 2

| Taster | Control Sample | Sample 1 |
|---|---|---|
| 1 | Lower mouthfeel | Higher mouthfeel |
| 2 | Lower mouthfeel | Higher mouthfeel |
| 3 | Lower mouthfeel | Higher mouthfeel |

As shown in Table 2, all three tasters indicated that Sample 1 containing 100 ppm of the compound of Formula IIa exhibited higher mouthfeel than the control sample.

Example 4—Sensory Evaluation Study for Diet Cola Beverage

A sensory test was conducted to show that the compound of Formula IIa enhances the mouthfeel of a diet cola beverage. Aqueous samples were prepared as follows.

A diet cola beverage base was prepared in accordance with the procedures described in Example 2. Sample 1 was prepared by adding a sufficient quantity of the compound of Formula IIa to a portion of the diet cola beverage base to achieve a concentration of 100 ppm, and stirring the mixture. The remaining diet cola beverage base was used as a control sample.

Three tasters were then asked to evaluate the mouthfeel properties of Sample 1 as compared to the control sample in a blind taste test. In particular, the tasters were asked to comment whether Sample 1 or the control sample had a higher or lower mouthfeel as compared to each other, where "higher mouthfeel" and "lower mouthfeel" are defined as in Example 3. The results are shown below in Table 3.

TABLE 3

| Taster | Control Sample | Sample 1 |
|---|---|---|
| 1 | Lower mouthfeel | Higher mouthfeel |
| 2 | Lower mouthfeel | Higher mouthfeel |
| 3 | Lower mouthfeel | Higher mouthfeel |

As shown in Table 3, all three tasters indicated that Sample 1 containing 100 ppm of the compound of Formula IIa exhibited higher mouthfeel than the control sample.

Example 5—Sensory Evaluation Study for Mid-Calorie Clear Soda Beverage

A sensory test was conducted to show that the compound of Formula IIa enhances the mouthfeel of a mid-calorie clear soda beverage. Aqueous samples were prepared as follows.

A mid-calorie clear soda beverage concentrate was prepared by adding 281.45 g granulated sucrose, 1.439 g sodium benzoate, 2.797 g sodium citrate trihydrate, 6.269 g anhydrous citric acid, 3.195 g malic acid, 0.456 g 25% liquid sucrose, 0.6749 g of a dry sweetener blend (42.0997% steviol glycosides SG95 granular PS, 42.0997% steviol glycosides granular PS (99% rebaudioside A), 15.8007% steviol glycosides alpha granulated (82% rebaudioside A, 18% stevia glycosides), and 10.374 g 7Up® flavor to 800.84 g water. The beverage concentrate was then diluted in a 1:5 ratio with carbonated water to form a mid-calorie clear soda beverage base. Sample 1 was prepared by adding a sufficient quantity of the compound of Formula IIa to a portion of the mid-calorie clear soda beverage base to achieve a concentration of 100 ppm, and stirring the mixture. The remaining mid-calorie clear soda beverage base was used as a control sample.

Five tasters were then asked to evaluate the mouthfeel properties of Sample 1 as compared to the control sample in a blind taste test. In particular, the tasters were asked to comment whether Sample 1 or the control sample had a higher or lower mouthfeel as compared to each other, where "higher mouthfeel" and "lower mouthfeel" are defined as in Example 3. The results are shown below in Table 4.

TABLE 4

| Taster | Control Sample | Sample 1 |
|--------|---------------|----------|
| 1 | Lower mouthfeel | Higher mouthfeel |
| 2 | Lower mouthfeel | Higher mouthfeel |
| 3 | Lower mouthfeel | Higher mouthfeel |
| 4 | Lower mouthfeel | Higher mouthfeel |
| 5 | Higher mouthfeel | Lower mouthfeel |

As shown in Table 4, four of the 5 tasters indicated that Sample 1 containing 100 ppm of the compound of Formula IIa exhibited higher mouthfeel than the control sample.

What is claimed is:

1. A composition comprising a compound of Formula I:

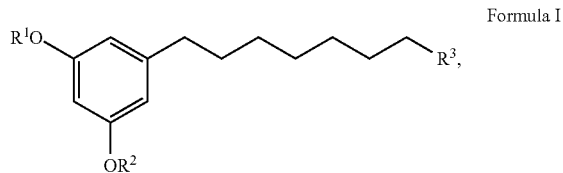

Formula I wherein $R^1$ and $R^2$ are each H or glucosyl, provided that at least one of $R^1$ or $R^2$ is glucosyl;
and $R^3$ is a $C_1$-$C_{15}$ linear, branched, or cyclic alkyl, alkenyl, or alkynyl group.

2. The composition of claim 1, wherein the compound of Formula I is a compound of Formula II:

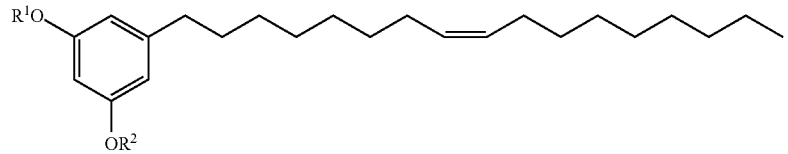

Formula II

3. The composition of claim 1, wherein the compound of Formula I is present in the composition at a concentration of about 0.1 ppm to about 1000 ppm.

4. The composition of claim 3, wherein the compound of Formula I is present in the composition at a concentration of about 50 ppm to about 100 ppm.

5. The composition of claim 1, wherein the composition is a beverage.

6. The composition of claim 5, wherein the compound of Formula I is present in the composition at a concentration of about 50 ppm to about 100 ppm.

7. The composition of claim 1, wherein the composition is a beverage concentrate.

8. The composition of claim 7, wherein the compound of Formula I is present in the composition at a concentration of about 300 ppm to about 600 ppm.

9. The beverage of claim 5, further comprising a non-nutritive sweetener.

10. The beverage of claim 9, wherein the non-nutritive sweetener is selected from the group consisting of a steviol glycoside, Lo Han Guo sweetener, rubusoside, siamenoside, monatin, curculin, glycyrrhizic acid, neohesperidin, dihydrochalcone, glycyrrhizin, glycyphyllin, phloridzin, trilobatin, phyllodulcin, brazzein, hernandulcin, osladin, polypodoside A, baiyunoside, pterocaryoside A and B, mukurozioside, thaumatin, monellin, mabinlins I and II, phlomisoside I, periandrin I, abrusoside A, and cyclocarioside I, mogroside IV, mogroside V, or combinations thereof.

11. The beverage of claim 10, wherein the steviol glycoside is selected from the group consisting of stevioside, rebaudioside A, rebaudioside B, rebaudioside C, rebaudioside D, rebaudioside E, rebaudioside F, rebaudioside G rebaudioside H rebaudioside I, rebaudioside J, rebaudioside K, rebaudioside L, rebaudioside M, rebaudioside N, rebaudioside o, rebaudioside P, rebaudioside Q, steviolbioside, dulcoside A, and combinations thereof.

12. The beverage of claim 5, further comprising a nutritive sweetener.

13. The beverage of claim 12, wherein the nutritive sweetener is selected from the group consisting of sucrose, fructose, glucose, dextrose, maltose, trehalose, fructo-oligosaccharides, glucose-fructose syrup from natural sources such as apple, chicory, and honey; high fructose corn syrup, invert sugar, maple syrup, maple sugar, honey, brown sugar molasses, cane molasses, such as first molasses, second molasses, blackstrap molasses, and sugar beet molasses; sorghum syrup, and mixtures thereof.

14. The beverage of claim 5, wherein the beverage is a carbonated beverage, a non-carbonated beverage, a fountain beverage, a frozen beverage, a frozen carbonated beverage, a fruit juice, a fruit juice-flavored drink, a fruit-flavored drink, a cola beverage, a sports drink, an energy drink, a fortified/enhanced water drink, a flavored water, a soy drink, a vegetable drink, a grain-based drink, a malt beverage, a fermented drink, a yogurt drink, kefir, a coffee beverage, a tea beverage, a dairy beverage, a smoothie drink, a caffeinated energy drink, or an alcoholic beverage.

15. A method for improving mouthfeel of a beverage, the method comprising adding to the beverage a compound of Formula I:

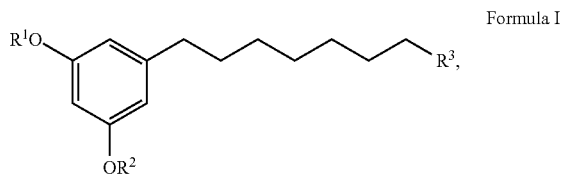

Formula I wherein $R^1$ and $R^2$ are each H or glucosyl, provided that at least one of $R^1$ or $R^2$ is glucosyl;
and $R^3$ is a $C_1$-$C_{15}$ linear, branched, or cyclic alkyl, alkenyl, or alkynyl group.

16. The method of claim 15, wherein the compound of Formula I is a compound of Formula II:

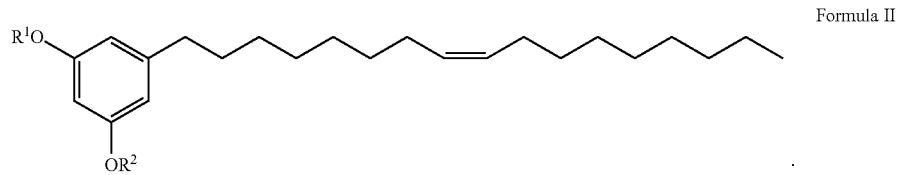

Formula II

17. The method of claim 15, wherein the compound of Formula I is added to the beverage in an amount sufficient to achieve a final concentration in the beverage of about 0.1 ppm to about 1000 ppm.

18. A method of making a beverage comprising combining at least
 1 part of a beverage concentrate; and
 5 parts water;
 wherein the beverage concentrate comprises a compound of Formula I:

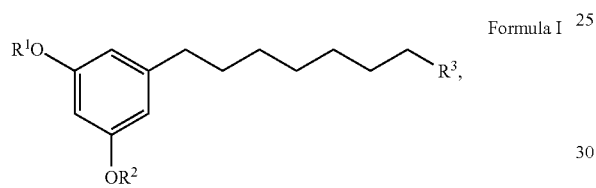

Formula I wherein $R^1$ and $R^2$ are each H or glucosyl, provided that at least one of $R^1$ or $R^2$ is glucosyl;
and $R^3$ is a $C_1$-$C_{15}$ linear, branched, or cyclic alkyl, alkenyl, or alkynyl group.

19. The method of claim 18, wherein the compound of Formula I is present in the beverage concentrate at a concentration of about 300 ppm to about 600 ppm.

* * * * *